US012158022B2

(12) United States Patent
Gao et al.

(10) Patent No.: US 12,158,022 B2

(45) Date of Patent: Dec. 3, 2024

(54) GAP CAULKING DEVICE AND A CAULKING METHOD

(71) Applicant: CHINA THREE GORGES CORPORATION, Beijing (CN)

(72) Inventors: Chao Gao, Beijing (CN); Yantong Dong, Beijing (CN); Zhiwei Wang, Beijing (CN); Jie Yu, Beijing (CN)

(73) Assignee: CHINA THREE GORGES CORPORATION (CN)

( * ) Notice: Subject to any disclaimer, the term of this patent is extended or adjusted under 35 U.S.C. 154(b) by 0 days.

(21) Appl. No.: 17/769,988

(22) PCT Filed: Apr. 27, 2021

(86) PCT No.: PCT/CN2021/090237

§ 371 (c)(1),
(2) Date: Apr. 18, 2022

(87) PCT Pub. No.: WO2022/016939

PCT Pub. Date: Jan. 27, 2022

(65) Prior Publication Data

US 2024/0133202 A1 Apr. 25, 2024
US 2024/0229493 A9 Jul. 11, 2024

(30) Foreign Application Priority Data

Nov. 6, 2020 (CN) ......................... 202011233058.2

(51) Int. Cl.
*E04H 9/02* (2006.01)
*B05C 17/01* (2006.01)
(Continued)

(52) U.S. Cl.
CPC ............. *E04H 9/027* (2013.01); *B05C 17/01* (2013.01); *E04B 1/98* (2013.01); *E04G 21/1841* (2013.01);
(Continued)

(58) Field of Classification Search
CPC .. E04B 1/98; E04H 9/02; E04H 9/021; E04H 9/0215; E04H 9/0235; E04G 21/1841; E04G 23/02; E04G 23/0203
See application file for complete search history.

(56) References Cited

U.S. PATENT DOCUMENTS 4,330,103 A * 5/1982 Thuries ................... F16F 15/02 52/167.6
4,533,109 A * 8/1985 Delam .................... E01D 19/04 248/618

(Continued)

FOREIGN PATENT DOCUMENTS

CN 102383497 A 3/2012
CN 107217866 A 9/2017

(Continued)

*Primary Examiner* — Jessie T Fonseca

(57) ABSTRACT

A gap caulking device and a caulking method are provided, wherein the gap caulking device includes long plates, short plates, a dial plate, a three-way joint, a tensioner and a limit rod, and a closed quadrilateral structure with an adjustable angle is formed by two long plates hinged to each other and two short plates hinged to each other, a dial plate and a pointer are respectively provided on the two short plates, damping rods hinged on the two short plates to each other and a three-way joint matched with the two long plates are passed through by a limit rod to achieve connection limiting, and a shape memory alloy wire is connected to the three-way joint by a tensioner and is parallel to the limit rod. The problem is overcome that the original traditional wedge-shaped material that gaps rely on has a single filling function.

18 Claims, 5 Drawing Sheets

(51) Int. Cl.

| | |
|---|---|
| ***E04B 1/98*** | (2006.01) |
| ***E04G 21/18*** | (2006.01) |
| ***E04G 23/02*** | (2006.01) |

(52) U.S. Cl.

CPC ......... *E04G 23/02* (2013.01); *E04G 23/0203* (2013.01); *E04H 9/021* (2013.01); *E04H 9/0215* (2020.05); *E04H 9/0235* (2020.05)

(56) References Cited

U.S. PATENT DOCUMENTS

| | | | | |
|---|---|---|---|---|
| 4,593,502 | A * | 6/1986 | Buckle | E04B 1/98 52/167.7 |
| 5,549,269 | A * | 8/1996 | Gertel | F16F 13/002 267/64.11 |
| 6,250,441 | B1 * | 6/2001 | Shimoda | F16F 9/103 267/136 |
| 10,208,828 | B2 * | 2/2019 | Gaudet | F16F 9/512 |
| 10,837,192 | B2 * | 11/2020 | Moreno | E04B 1/98 |
| 11,661,760 | B1 * | 5/2023 | Gao | E04H 9/0215 52/167.1 |

FOREIGN PATENT DOCUMENTS

| | | | |
|---|---|---|---|
| CN | 110410113 | A | 11/2019 |
| CN | 210091501 | U | 2/2020 |
| CN | 112443171 | A | 3/2021 |
| KR | 20050113911 | A | 12/2005 |
| WO | WO-2023234894 | A1 * | 12/2023 |

* cited by examiner

GAP CAULKING DEVICE AND A CAULKING METHOD

CROSS-REFERENCE TO RELATED APPLICATIONS

This application is a national stage application of PCT/CN2021/090237. This application claims priorities from PCT Application No. PCT/CN2021/090237, filed Apr. 27, 2021, and from the Chinese patent application 202011233058.2 filed Nov. 6, 2020, the content of which are incorporated herein in the entirety by reference.

FIELD OF TECHNOLOGY

The invention belongs to the field of building structure engineering, and relates to a gap caulking device and a caulking method.

BACKGROUND

Gaps are common in traditional and modern building structures. The gaps in traditional building structures mainly refers to the gaps between the tenon and mortise joints. Most of the traditional buildings are based on the wooden structure frame, and the wooden components are connected by mortise and tenon joints. The designed and processed tenon must be smaller than the size of the mortise to form the gap between the tenon and mortise joints in order to facilitate installation in place, especially the gap will be larger when the beam and column size are larger. In addition, the biological characteristics of wood itself make it inevitably susceptible to insects and environmental corrosion. Moreover, the gap between the tenon and the mortise will continue to expand due to the natural shrinkage of wood. There are also some gaps that need to be dealt with in modern building structures due to construction requirements, disrepair for long years and other reasons, such as ash gaps caused by the falling off of mortar in masonry structures, the gaps between column feet of prefabricated or steel structure buildings and ground, and gaps between beam-column joints and other gaps between components.

A part of the gaps have negative effects on the seismic resistance of the structure, on the one hand, they can relax the mutual constraint between the components, on the other hand, they are disadvantageous to the bearing capacity and stability of the structure or components. The traditional method of gap repair is wedge filling, but the wedge has a single function and is easy to lose, which is disadvantageous to the tolerance and earthquake resistance of the building structure.

SUMMARY

The technical problem to be solved by the present invention is to provide a gap caulking device and a caulking method, the gap caulking device has a simple structure, and wherein two long plates hinged to each other and two short plates hinged to each other are used to hinge to form a closed quadrilateral structure with an adjustable angle, a dial plate and a pointer are respectively provided on the two short plates, a limit rod passes through damping rods hinged on the two short plates to each other and a three-way joint matched with the two long plates to achieve connection limiting, and a shape memory alloy wire is connected to the three-way joint by a tensioner and is parallel to the limit rod, which is beneficial to monitoring various gap changes of a building structure, is reset autonomously in earthquake action, and is beneficial to consume earthquake energy.

In order to solve the above-mentioned technical problem, the technical solution adopted by the present invention is: a gap caulking device comprising long plates, short plates, a dial plate, a three-way joint, a tensioner and a limit rod; two long plates hinged to each other and two short plates hinged to each other are hinged to form a closed quadrilateral structure with an adjustable angle, the dial plate is connected to the short plates, the three-way joint matched with the long plates is arranged between a pin shaft of the two long plates hinged to each other, the tensioner is arranged on the damping rod on two short plates hinged to each other and is matched with the damping rod, the shape memory alloy wire of the tensioner is connected to the three-way joint, the limit rod passes through the damping rod and is in the screw thread fit with the three-way joint, and the shape memory alloy wire and the limit rod are parallel to each other.

The width of the long plates is the same as the width of the short plates, and the length of the long plates is greater than the length of the short plates.

The damping rod is a circular rod body, damping sleeves are arranged at both ends of the rod body, and a mounting hole and a limiting hole are arranged on the rod body, and the tension rod of the tensioner is matched with the mounting hole, and the limit rod is matched with the limiting hole.

The dial plate has an arc-shaped structure and is connected to a side of one of the short plates, and the pointer corresponding to the dial plate is connected to an upper side of an end of the other one of the short plates.

The three-way joint comprises a branch pipe connected vertically to an axis of a main pipe, and a connecting column located on a side of the branch pipe and vertically penetratingly connected to the axis of the main pipe, and an end of the limit rod is connected to the connecting column.

The tensioner comprises a clamp nut and a tension nut that are matched with the tension rod, and comprises a shape memory alloy wire connected to the tension rod.

The tension rod is a rod body provided with screw thread at an end, the wire hole axially penetrates the rod body, and a wire groove is axially provided at a screw thread end to communicate with the wire hole.

The number of the clamp nut is two, and an end of the shape memory alloy wire is clamped between the two clamp nuts; the tension nut is abutted against the damping rod.

An end of the shape memory alloy wire is provided with a lead block, said end of the shape memory alloy wire passes through the branch pipe of the three-way joint, and the lead block is abutted against the main pipe.

A caulking method of the gap caulking device as described above, which comprises the following steps:

S1, placing an end of two long plates hinged to each other into a gap to be caulked;

S2, rotating the two clamp nuts to make a shape memory alloy wire in slack state;

S3, pushing the hinge positions of the two short plates to adjust the opening and closing angles of the two long plates so as to make the two long plates fit with the structural components; wherein at this time, the scale value on the dial plate pointed by the pointer fluctuates;

S4, rotating the two clamp nuts again to clamp the shape memory alloy wire;

S5, rotating the tension nut to be abutted against the damping rod to drive the two short plates to push the two long plates to open and tension the shape memory alloy wire, such that the two long plates are opened and completely caulked in the gap; wherein at this time, the scale value on the dial plate pointed by the pointer no longer fluctuate;

S6, recording the scale value on the dial plate that the pointer points to.

A gap caulking device, which comprises long plates, short plates, a dial plate, a three-way joint, a tensioner and a limit rod; and two long plates hinged to each other and two short plates hinged to each other are hinged to form a closed quadrilateral structure with an adjustable angle, the dial plate is connected to the short plates, the three-way joint matched with the long plates is arranged between a pin shaft of the two long plates hinged to each other, the tensioner is arranged on the damping rod on two short plates hinged to each other and matched with the damping rod, the shape memory alloy wire of the tensioner is connected to the three-way joint, the limit rod passes through the damping rod and is matched with the screw thread of the three-way joint, and the shape memory alloy wire and the limit rod are parallel to each other. The structure is simple, and a closed quadrilateral structure with an adjustable angle is formed by two long plates hinged to each other and two short plates hinged to each other, a dial plate and a pointer are respectively provided on the two short plates, a damping rod hinged on the two short plates to each other and a three-way joint matched with the two long plates are passed through by a limit rod to achieve connection limiting, and a shape memory alloy wire is connected to the three-way joint by a tensioner and is parallel to the limit rod, which is beneficial to monitoring gap changes, is reset autonomously in earthquake action, and is beneficial to consume earthquake energy.

In a preferred embodiment, the width of the long plates is the same as the width of the short plates, and the length of the long plates is greater than the length of the short plates. The structure is simple, and when in use, an end of two long plates hinged to each other is placed into a gap to be caulked, and the hinge positions of the two short plates are pushed to adjust the opening and closing angles of the two long plates.

In a preferred embodiment, the damping rod is a circular rod body, damping sleeves are arranged at both ends of the rod body, and a mounting hole and a limiting hole are arranged on the rod body, and the tension rod of the tensioner is matched with the mounting hole, and the limit rod is matched with the limiting hole. The structure is simple, and when in use, the damping sleeves at the two ends of the damping rod are matched with shaft holes of the short plates, and the limit rod passes through the limiting hole and is connected to the connecting column of the three-way joint, and the limit rod plays a limiting role when the hinge positions of the two short plates are pushed to adjust the opening and closing angle of the two long plates, so that the damping rod and the three-way joint do not rotate with the opening and closing change of the angle of the two short plates, so as to ensure that the shape memory alloy wire is always parallel to the diagonal of the closed quadrilateral structure, and the angle adjustment is convenient, and the adaptability is good.

In a preferred embodiment, the dial plate has an arc-shaped structure and is connected to a side of one of the short plates, and the pointer corresponding to the dial plate is connected to an upper side of an end of the other one of the short plates. The structure is simple, and when in use, the scale value is recorded when the scale value on the dial plate pointed by the pointer no longer fluctuates after the long plates and the gap are completely caulked, which is beneficial to monitoring the development of the gap.

In a preferred embodiment, the three-way joint comprises a branch pipe connected vertically to an axis of a main pipe, and a connecting column located on a side of the branch pipe and vertically penetratingly connected to the axis of the main pipe, and an end of the limit rod is connected to the connecting column. The structure is simple, and when in use, the main pipe cooperates with the shaft holes on the long plates to rotate around the same, the branch pipe is configured to connect the shape memory alloy wire, and the connecting column is configured to connect the limit rod.

In a preferred embodiment, the tensioner comprises a clamp nut and a tension nut that are matched with the tension rod, and comprises a shape memory alloy wire connected to the tension rod. The structure is simple, and when in use, the tensioner is configured to rotate the tension nut to drive the two short plates to push the two long plates to open and make full contact with the gap after the two long plates are placed in the gap so as to achieve the caulking effect.

In a preferred embodiment, the tension rod is a rod body provided with screw thread at an end, the wire hole axially penetrates the rod body, and a wire groove is axially provided at a screw thread end to communicate with the wire hole. The structure is simple, and when in use, the wire hole on the tension rod is configured to pass through the shape memory alloy wire, and then the shape memory alloy wire is led out from a side of the wire groove, such that an end of the shape memory alloy wire is located between two clamp nuts, so as to facilitate the clamping of the shape memory alloy wire.

In a preferred embodiment, the number of the clamp nut is two, and an end of the shape memory alloy wire is clamped between the two clamp nuts; and the tension nut is abutted against the damping rod. The structure is simple, and when in use, the number of clamp nut fit with the tension rod is one before the shape memory alloy wire passes through the wire hole of the tension rod, and when the shape memory alloy wire passes through the wire hole of the tension rod and is led out from one side of the wire groove, another clamp nut is matched with the tension rod, such that an end of the shape memory alloy wire is located between the two clamp nuts.

In a preferred embodiment, an end of the shape memory alloy wire is provided with a lead block, said end of the shape memory alloy wire passes through the branch pipe of the three-way joint, and the lead block is abutted against the main pipe. The structure is simple, and when in use, the shape memory alloy wire at an end away from the lead block successively passes through the main pipe, the branch pipe and the tension rod, and the lead block is abutted against the main pipe and is easy to install, and the self-resetting function of the shape memory alloy wire can assist the structure to reset itself in the earthquake.

The caulking method of the gap caulking device as above, which comprises the following steps:

S1, placing an end of two long plates hinged to each other into a gap to be caulked;

S2, rotating the two clamp nuts to make a shape memory alloy wire in slack state;

S3, pushing the hinge positions of the two short plates to adjust the opening and closing angles of the two long plates so as to make the two long plates fit with the structural components; wherein at this time, the scale value on the dial plate pointed by the pointer fluctuates;

S4, rotating the two clamp nuts again to clamp the shape memory alloy wire;

S5, rotating the tension nut to be abutted against the damping rod to drive the two short plates to push the two long plates to open and tension the shape memory alloy wire, such that the two long plates are opened and completely caulked in the gap; wherein at this time, the scale value on the dial plate pointed by the pointer no longer fluctuate;

S6, recording the scale value on the dial plate that the pointer points to. The method is simple and convenient to operate, and has the effect of monitoring gap development.

A gap caulking device and a caulking method are provided, wherein the gap caulking device comprises long plates, short plates, a dial plate, a three-way joint, a tensioner and a limit rod, and a closed quadrilateral structure with an adjustable angle is formed by two long plates hinged to each other and two short plates hinged to each other, a dial plate and a pointer are respectively provided on the two short plates, damping rods hinged on the two short plates to each other and a three-way joint matched with the two long plates are passed through by a limit rod to achieve connection limiting, and a shape memory alloy wire is connected to the three-way joint by a tensioner and is parallel to the limit rod. The problem is overcome that the original wedge-shaped material that gaps rely on has a single filling function, which is disadvantageous to the tolerance and earthquake resistance of the building structure. Meanwhile, the gap caulking device has the characteristics of simple structure, easy monitoring of gap changes of the building structure, self-resetting during earthquake action, and being beneficial to the consumption of earthquake energy.

BRIEF DESCRIPTION OF THE DRAWINGS

The invention will now be further described below in conjunction with the drawings and embodiments.

Figure 1:
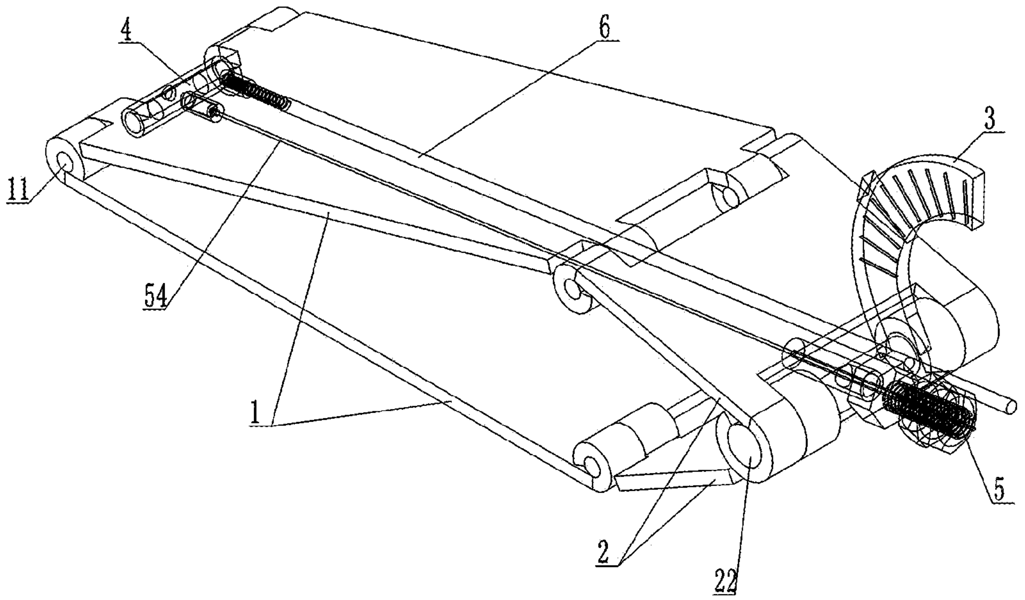
FIG. 1 is a schematic view showing a structure of the present invention.

Wherein: a long plate 1, a pin shaft 11, a short plate 2, a damping rod 21, a damping sleeve 22, a mounting hole 23, a limiting hole 24, a dial plate 3, a pointer 31, a three-way joint 4, a main pipe 41, a branch pipe 42, a connecting column 43, a tensioner 5, a tension rod 51, a clamp nut 52, a tension nut 53, a shape memory alloy wire 54, a wire hole 55, a wire groove 56, a lead block 57, and a limit rod 6.

DETAILED DESCRIPTION OF THE EMBODIMENTS

Figure 2:
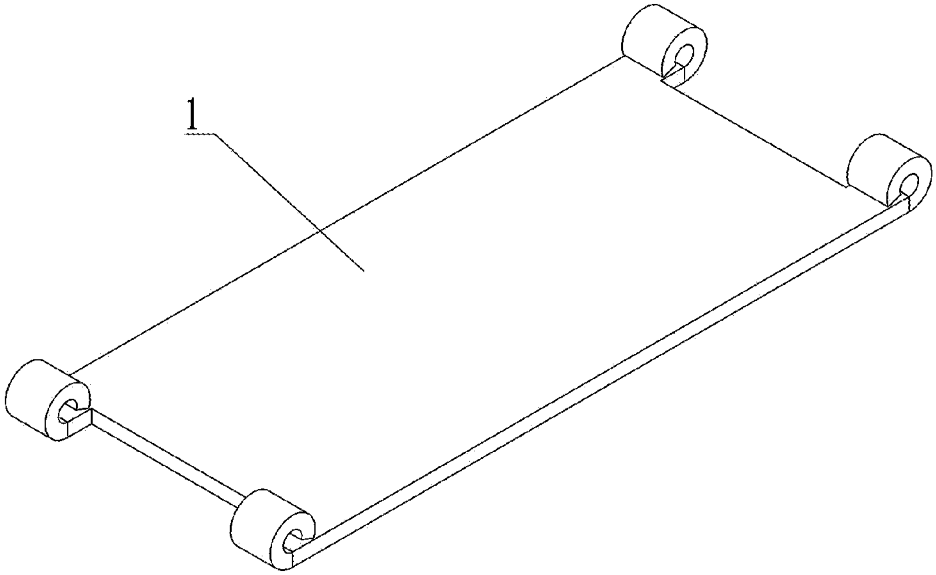
FIG. 2 is a schematic view showing a structure of a long plate of the present invention.
Figure 3:
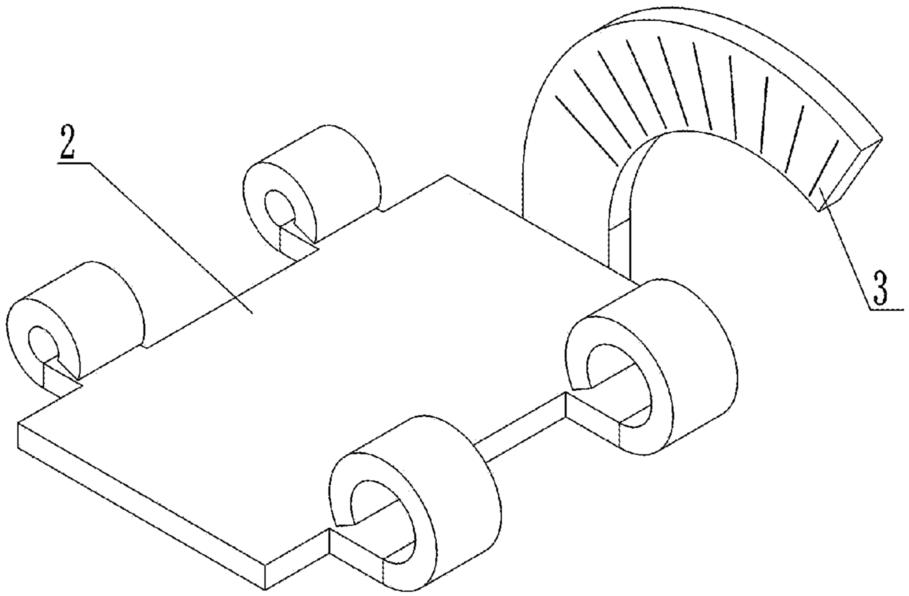
FIG. 3 is a schematic view showing a structure wherein a short plate is connected to a dial plate according to the present invention.
Figure 4:
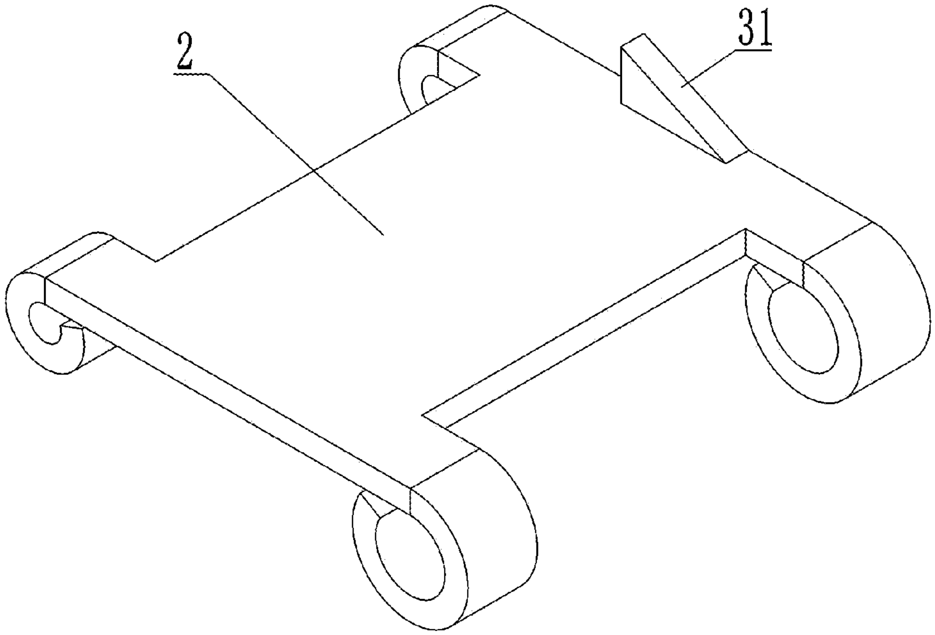
FIG. 4 is a schematic view showing a structure of another short plate connected to a pointer according to the present invention.
Figure 5:
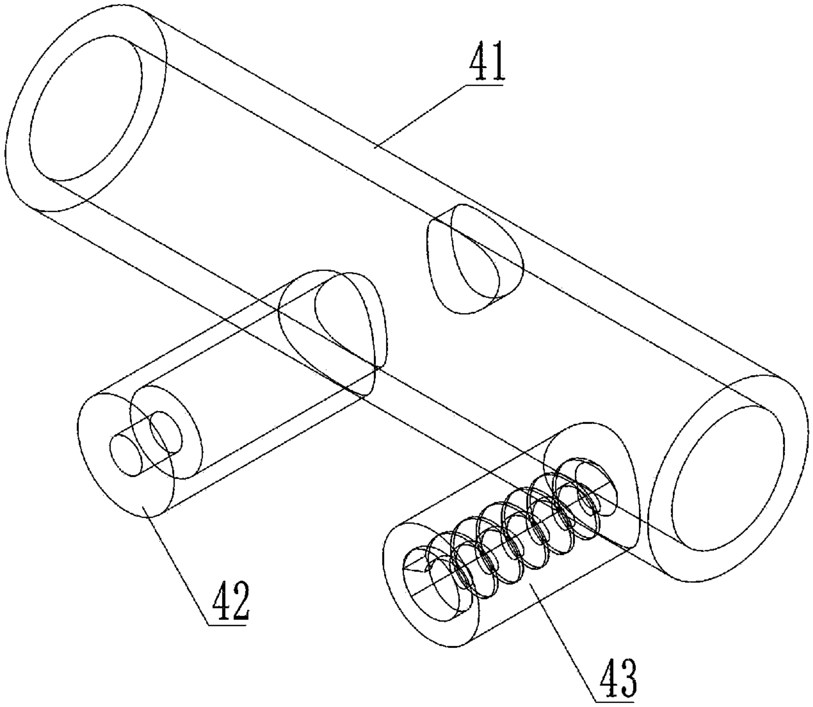
FIG. 5 is a schematic view showing a structure of a damping rod according to the present invention.
Figure 6:
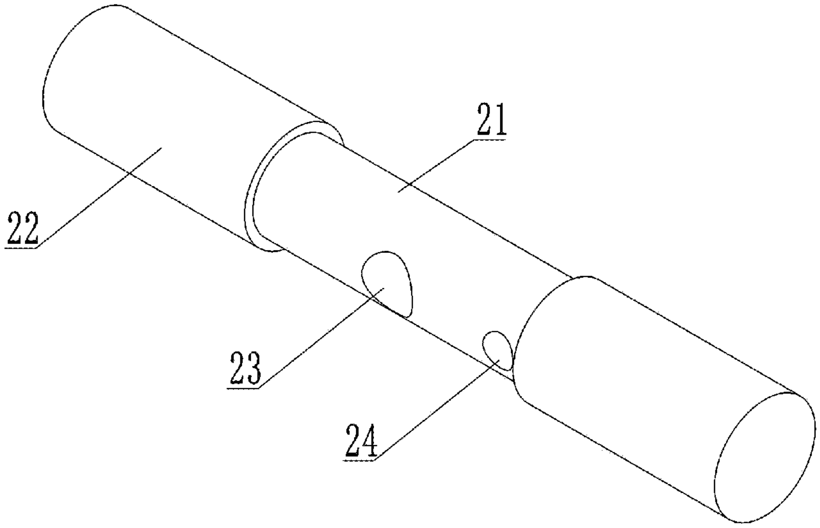
FIG. 6 is a schematic view of a three-way joint of the present invention.
Figure 7:
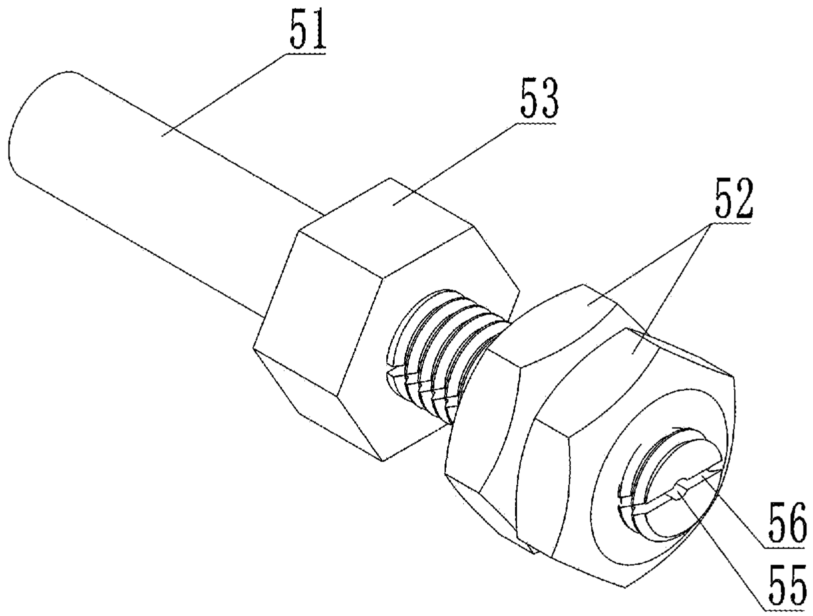
FIG. 7 is a schematic view showing a structure of the tensioner of the present invention.
Figure 8:
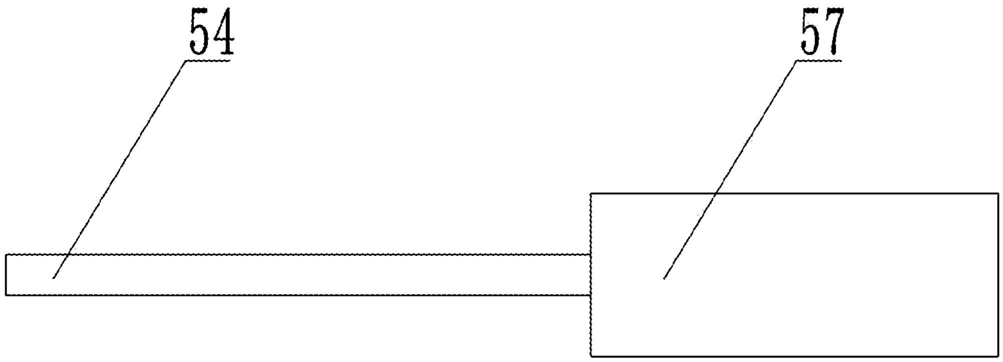
FIG. 8 is a schematic view showing a structure of a shape memory alloy wire according to the present invention.
Figure 9:
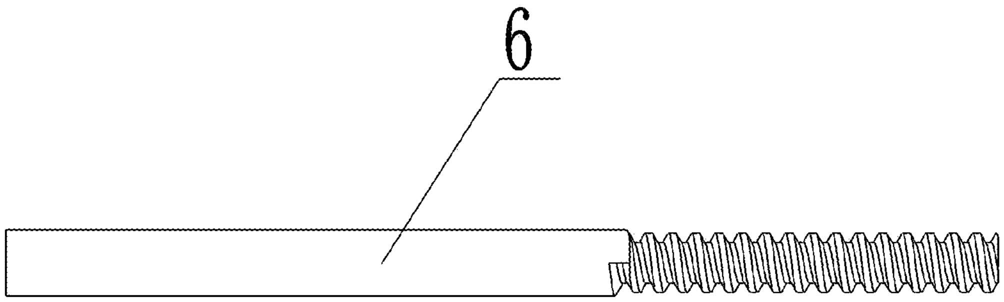
FIG. 9 is a schematic view showing a structure of a limit rod according to the present invention.
Figure 10:
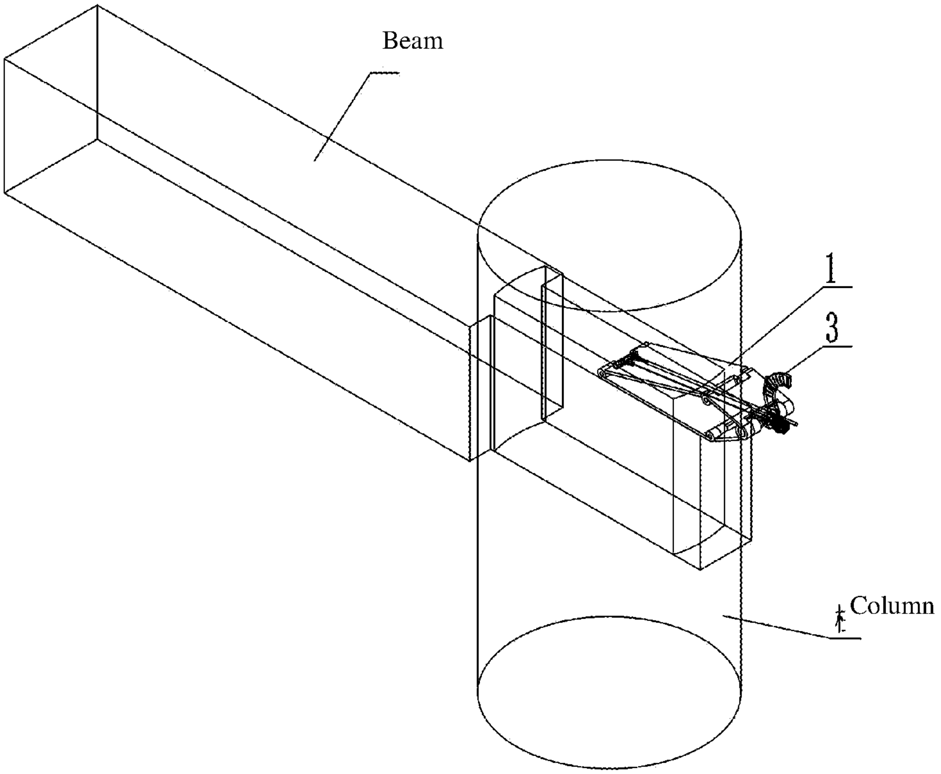
FIG. 10 is a use state diagram of the present invention.

As shown in FIGS. 1-10, a gap caulking device, which comprises long plates 1, short plates 2, a dial plate 3, a three-way joint 4, a tensioner 5 and a limit rod 6; and two long plates 1 hinged to each other and two short plates 2 hinged to each other are hinged to form a closed quadrilateral structure with an adjustable angle, the dial plate 3 is connected to the short plates 2, the three-way joint 4 matched with the long plates 1 is arranged between a pin shaft 11 of the two long plates 1 hinged to each other, the tensioner 5 is arranged on the damping rod 21 on two short plates 2 hinged to each other and matched with the damping rod 21, the shape memory alloy wire 54 of the tensioner 5 is connected to the three-way joint 4, the limit rod 6 passes through the damping rod 21 and is matched with the screw thread of the three-way joint 4, and the shape memory alloy wire 54 and the limit rod 6 are parallel to each other. The structure is simple, and a closed quadrilateral structure with an adjustable angle is formed by two long plates 1 hinged to each other and two short plates 2 hinged to each other, a dial plate 3 and a pointer 31 are respectively provided on the two short plates 2, a damping rod 21 hinged on the two short plates 2 to each other and a three-way joint 4 matched with the two long plates 1 are passed through by a limit rod 6 to achieve connection limiting, and a shape memory alloy wire 54 is connected to the three-way joint 4 by a tensioner 5 and is parallel to the limit rod 6, which facilitates monitoring gap changes, is reset autonomously in earthquake action, and is beneficial to consume earthquake energy.

Preferably, the limit rod 6 is a rod-shaped body, and a screw thread end is fit with the connection column 43.

In a preferred embodiment, the width of the long plates 1 is the same as the width of the short plates 2, and the length of the long plates 1 is greater than the length of the short plates 2. The structure is simple, and when in use, an end of two long plates 1 hinged to each other is placed into a gap to be caulked, and the hinge positions of the two short plates 2 are pushed to adjust the opening and closing angles of the two long plates 1.

In a preferred embodiment, the damping rod 21 is a circular rod body, damping sleeves 22 are arranged at both ends of the rod body, and a mounting hole 23 and a limiting hole 24 are arranged on the rod body, and the tension rod 51 of the tensioner 5 is matched with the mounting hole 23, and the limit rod 6 is matched with the limiting hole 24. The structure is simple, and when in use, the damping sleeves 22 at the two ends of the damping rod 21 are matched with shaft holes of the short plates 2, and the limit rod 6 passes through the limiting hole 24 and is connected to the connecting column 43 of the three-way joint 4, and the limit rod 6 plays a limiting role when the hinge positions of the two short plates 2 are pushed to adjust the opening and closing angle of the two long plates 1, so that the damping rod 21 and the three-way joint 4 do not rotate with the opening and closing change of the angle of the two short plates 2, so as to ensure that the shape memory alloy wire 54 is always parallel to the diagonal of the closed quadrilateral structure, and the angle adjustment is convenient, and the adaptability is good.

Preferably, the material of the damping sleeves 22 is rubber, plastic, a copper-zinc-aluminum series, an iron-chromium-molybdenum series, a manganese-copper series alloy, or a damping coating to facilitate damping, dissipating heat, delaying the movement time of the structure in an earthquake and consuming earthquake energy.

In a preferred embodiment, the dial plate 3 has an arc-shaped structure and is connected to a side of one of the short plates 2, and the pointer 31 corresponding to the dial plate 3 is connected to an upper side of an end of the other one of the short plates 2. The structure is simple, and when in use, the scale value is recorded when the scale value on the dial plate 3 pointed by the pointer 31 no longer fluctuates after the long plates 1 and the gap are completely caulked, which is beneficial to monitoring the development of the gap.

In a preferred embodiment, the three-way joint 4 comprises a branch pipe 42 connected vertically to an axis of a main pipe 41, and a connecting column 43 located on a side of the branch pipe 42 and vertically penetratingly connected to the axis of the main pipe 41, and an end of the limit rod 6 is connected to the connecting column 43. The structure is simple, and when in use, the main pipe 41 cooperates with the shaft holes on the long plates 1 to rotate around the same, the branch pipe 42 is configured to connect the shape memory alloy wire 54, and the connecting column 43 is configured to connect the limit rod 6.

In a preferred embodiment, the tensioner 5 comprises a clamp nut 52 and a tension nut 53 that are matched with the tension rod 51, and comprises a shape memory alloy wire 54 connected to the tension rod 51. The structure is simple, and when in use, the tensioner 5 is configured to rotate the tension nut 53 to drive the two short plates 2 to push the two long plates 1 to open and make full contact with the gap after the two long plates 1 are placed in the gap so as to achieve the caulking effect.

In a preferred embodiment, the tension rod 51 is a rod body provided with screw thread at an end, the wire hole 55 axially penetrates the rod body, and a wire groove 56 is axially provided at a screw thread end to communicate with the wire hole 55. The structure is simple, and when in use, the wire hole 55 on the tension rod 51 is configured to pass through the shape memory alloy wire 54, and then the shape memory alloy wire 54 is led out from a side of the wire groove 56, such that an end of the shape memory alloy wire 54 is located between two clamp nuts 52, so as to facilitate the clamping of the shape memory alloy wire 54.

In a preferred embodiment, the number of the clamp nut 52 is two, and an end of the shape memory alloy wire 54 is clamped between the two clamp nuts 52; and the tension nut 53 is abutted against the damping rod 21. The structure is simple, and when in use, the number of clamp nut 52 fit with the tension rod 51 is one before the shape memory alloy wire 54 passes through the wire hole 55 of the tension rod 51, and when the shape memory alloy wire 54 passes through the wire hole 55 of the tension rod 51 and is led out from one side of the wire groove 56, another clamp nut 52 is matched with the tension rod 51, such that an end of the shape memory alloy wire 54 is located between the two clamp nuts 52.

In a preferred embodiment, an end of the shape memory alloy wire 54 is provided with a lead block 57, said end of the shape memory alloy wire 54 passes through the branch pipe 42 of the three-way joint 4, and the lead block 57 is abutted against the main pipe 41. The structure is simple, and when in use, the shape memory alloy wire 54 at an end away from the lead block 57 successively passes through the main pipe 41, the branch pipe 42 and the tension rod 51, and the lead block 57 is abutted against the main pipe 41 and is easy to install, and the self-resetting function of the shape memory alloy wire 54 can assist the structure to reset itself in the earthquake.

A caulking method of the gap caulking device as described above, which comprises the following steps:

S1, placing an end of two long plates 1 hinged to each other into a gap to be caulked;

S2, rotating the two clamp nuts 52 to make a shape memory alloy wire 54 in slack state;

S3, pushing the hinge positions of the two short plates 2 to adjust the opening and closing angles of the two long plates 1 so as to make the two long plates 1 fit with the structural components; wherein at this time, the scale value on the dial plate 3 pointed by the pointer 31 fluctuates;

S4, rotating the two clamp nuts 52 again to clamp the shape memory alloy wire 54;

S5, rotating the tension nut 53 to be abutted against the damping rod 21 to drive the two short plates 2 to push the two long plates 1 to open and tension the shape memory alloy wire 54, such that the two long plates 1 are opened and completely caulked in the gap; wherein at this time, the scale value on the dial plate 3 pointed by the pointer 31 no longer fluctuate;

S6, recording the scale value on the dial plate 3 that the pointer 31 points to. The method is simple and convenient to operate, and has the effect of monitoring gap development.

The above mentioned gap caulking device and caulking method, when the caulking device is installed and in use, a closed quadrilateral structure with an adjustable angle is formed by two long plates 1 hinged to each other and two short plates 2 hinged to each other, a dial plate 3 and a pointer 31 are respectively provided on the two short plates 2, a damping rod 21 hinged on the two short plates 2 to each other and a three-way joint 4 matched with the two long plates 1 are passed through by a limit rod 6 to achieve connection limiting, and a shape memory alloy wire 54 is connected to the three-way joint 4 by a tensioner 5 and is parallel to the limit rod 6, which facilitates monitoring gap changes, is reset autonomously in earthquake action, and is beneficial to consume earthquake energy.

When in use, an end of two long plates 1 hinged to each other is placed into a gap to be caulked, and the hinge positions of the two short plates 2 are pushed to adjust the opening and closing angles of the two long plates 1.

When in use, the damping sleeves 22 at the two ends of the damping rod 21 are matched with shaft holes of the short plates 2, and the limit rod 6 passes through the limiting hole 24 and is connected to the connecting column 43 of the three-way joint 4, and the limit rod 6 plays a limiting role when the hinge positions of the two short plates 2 are pushed to adjust the opening and closing angle of the two long plates 1, so that the opening and closing angle of the two long plates 1 and the two short plates 2 remains symmetrical with the limiting rod 6 as an axis, and the angle adjustment is convenient, and the adaptability is good.

When in use, the scale value is recorded when the scale value on the dial plate 3 pointed by the pointer 31 no longer fluctuates after the long plates 1 and the gap are completely caulked, which is beneficial to monitoring the development of the gap.

When in use, the main pipe 41 cooperates with the shaft holes on the long plates 1 to rotate around the same, the branch pipe 42 is configured to connect the shape memory alloy wire 54, and the connecting column 43 is configured to connect the limit rod 6.

When in use, the tensioner 5 is configured to rotate the tension nut 53 to drive the two short plates 2 to push the two long plates 1 to open and make full contact with the gap after the two long plates 1 are placed in the gap so as to achieve the caulking effect.

When in use, the wire hole 55 on the tension rod 51 is configured to pass through the shape memory alloy wire 54, and then the shape memory alloy wire 54 is led out from a side of the wire groove 56, such that an end of the shape memory alloy wire 54 is located between two clamp nuts 52, so as to facilitate the clamping of the shape memory alloy wire 54.

When in use, the number of clamp nut 52 fit with the tension rod 51 is one before the shape memory alloy wire 54 passes through the wire hole 55 of the tension rod 51, and when the shape memory alloy wire 54 passes through the wire hole 55 of the tension rod 51 and is led out from one side of the wire groove 56, another clamp nut 52 is matched with the tension rod 51, such that an end of the shape memory alloy wire 54 is located between the two clamp nuts 52.

When in use, the shape memory alloy wire 54 at an end away from the lead block 57 successively passes through the main pipe 41, the branch pipe 42 and the tension rod 51, and the lead block 57 is abutted against the main pipe 41 and is easy to install, and the self-resetting function of the shape memory alloy wire 54 can assist the structure to reset itself in the earthquake.

The embodiments described above are only preferred embodiments of the present invention and should not be considered as limitations of the present invention, and the embodiments and features of the embodiments in the present application can be combined with each other in any combination without conflict. It is intended that the scope of the invention be defined by the claims appended hereto, including all equivalent alternatives of the features in the technical solutions described in the claims appended hereto. That is, equivalent replacements and improvements within this scope are also within the protection scope of the present invention.

The invention claimed is:

1. A gap caulking device, comprising two long plates (1), two short plates (2), a dial plate (3), a three-way joint (4), a tensioner (5) and a limit rod (6); the two long plates (1) hinged to each other and the two short plates (2) hinged to each other are hinged to form a closed quadrilateral structure with an adjustable angle, the dial plate (3) is connected to the two short plates (2), the three-way joint (4) matched with the two long plates (1) is arranged between a pin shaft (11) of the two long plates (1) hinged to each other, the tensioner (5) is arranged on a damping rod (21) on the two short plates (2) hinged to each other and is matched with the damping rod (21), a shape memory alloy wire (54) of the tensioner (5) is connected to the three-way joint (4), the limit rod (6) passes through the damping rod (21) and is in screw thread fit with the three-way joint (4), and the shape memory alloy wire (54) and the limit rod (6) are parallel to each other.

2. The gap caulking device according to claim 1, wherein the width of the two long plates (1) is the same as the width of the two short plates (2), and the length of the two long plates (1) is greater than the length of the two short plates (2).

3. The gap caulking device according to claim 1, wherein the damping rod (21) comprises a circular rod body comprising a first end and a second end, damping sleeves (22) are arranged at the first end and the second end of the circular rod body, and a mounting hole (23) and a limiting hole (24) are arranged on the circular rod body, and a tension rod (51) of the tensioner (5) is matched with the mounting hole (23), and the limit rod (6) is matched with the limiting hole (24).

4. The gap caulking device according to claim 1, wherein the dial plate (3) comprises an arc-shaped structure and is connected to a side of one short plate of the two short plates (2), and a pointer (31) corresponding to the dial plate (3) is connected to an upper side of an end of other one short plate of the two short plates (2).

5. The gap caulking device according to claim 1, wherein the three-way joint (4) comprises a branch pipe (42) vertically connected to an axis of a main pipe (41), and a connecting column (43) located on a side of the branch pipe (42) and vertically penetratingly connected to an axis of the main pipe (41), and an end of the limit rod (6) is connected to the connecting column (43).

6. The gap caulking device according to claim 1, wherein the tensioner (5) comprises two clamp nuts (52) and a tension nut (53) that are matched with a tension rod (51), and comprises the shape memory alloy wire (54) connected to the tension rod (51).

7. The gap caulking device according to claim 6, wherein the tension rod (51) comprises a circular rod body provided with screw thread at an end, a wire hole (55) axially penetrates the circular rod body, and a wire groove (56) is axially provided at a screw thread end to communicate with the wire hole (55).

8. The gap caulking device according to claim 6, wherein the number of the two clamp nuts (52) is two, and an end of the shape memory alloy wire (54) is clamped between the two clamp nuts (52); the tension nut (53) is abutted against the damping rod (21).

9. The gap caulking device according to claim 6, wherein an end of the shape memory alloy wire (54) is provided with a lead block (57), the end of the shape memory alloy wire (54) passes through a branch pipe (42) of the three-way joint (4), and the lead block (57) is abutted against a main pipe (41).

10. A caulking method of the gap caulking device according to claim 1, comprising the following steps:

S1, placing an end of the two long plates (1) hinged to each other into a gap to be caulked;

S2, rotating two clamp nuts (52) to make the shape memory alloy wire (54) in slack state;

S3, pushing hinge positions of the two short plates (2) to adjust opening and closing angles of the two long plates (1) so as to make the two long plates (1) fit with structural components; wherein at this time, a scale value on the dial plate (3) pointed by a pointer (31) fluctuates;

S4, rotating the two clamp nuts (52) again to clamp the shape memory alloy wire (54);

S5, rotating a tension nut (53) to be abutted against the damping rod (21) to drive the two short plates (2) to push the two long plates (1) to open and tension the shape memory alloy wire (54), such that the two long plates (1) are opened and completely caulked in the gap; wherein at this time, the scale value on the dial plate (3) pointed by the pointer (31) no longer fluctuate;

S6, recording the scale value on the dial plate (3) that the pointer (31) points to.

11. The method of claim 10, wherein the width of the two long plates (1) is the same as the width of the two short plates (2), and the length of the two long plates (1) is greater than the length of the two short plates (2).

12. The method of claim 10, wherein the damping rod (21) comprises a circular rod body comprising a first end and a second end, damping sleeves (22) are arranged at the first end and the second end of the circular rod body, and a mounting hole (23) and a limiting hole (24) are arranged on the circular rod body, and a tension rod (51) of the tensioner (5) is matched with the mounting hole (23), and the limit rod (6) is matched with the limiting hole (24).

13. The method of claim 10, wherein the dial plate (3) comprises an arc-shaped structure and is connected to a side of one short plate of the two short plates (2), and the pointer (31) corresponding to the dial plate (3) is connected to an upper side of an end of other one short plate of the two short plates (2).

14. The method of claim 10, wherein the three-way joint (4) comprises a branch pipe (42) vertically connected to an axis of a main pipe (41), and a connecting column (43) located on a side of the branch pipe (42) and vertically penetratingly connected to the axis of the main pipe (41), and an end of the limit rod (6) is connected to the connecting column (43).

15. The method of claim 10, wherein the tensioner (5) comprises the two clamp nuts (52) and the tension nut (53) that are matched with a tension rod (51), and comprises the shape memory alloy wire (54) connected to the tension rod (51).

16. The method of claim 15, wherein the tension rod (51) comprises a circular rod body provided with screw thread at an end, a wire hole (55) axially penetrates the circular rod body, and a wire groove (56) is axially provided at the screw thread end to communicate with the wire hole (55).

17. The method of claim 15, wherein the number of the two clamp nuts (52) is two, and an end of the shape memory alloy wire (54) is clamped between the two clamp nuts (52); the tension nut (53) is abutted against the damping rod (21).

18. The method of claim 15, wherein an end of the shape memory alloy wire (54) is provided with a lead block (57), the end of the shape memory alloy wire (54) passes through a branch pipe (42) of the three-way joint (4), and the lead block (57) is abutted against a main pipe (41).

* * * * *